United States Patent
Nasshan et al.

(10) Patent No.: US 6,594,487 B1
(45) Date of Patent: Jul. 15, 2003

(54) RECEPTION DEVICE FOR A RADIO COMMUNICATION SYSTEM FOR RECEIVING SUBSCRIBER SIGNALS VIA A RADIO INTERFACE

(75) Inventors: Markus Nasshan, Bocholt (DE); Anja Klein, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,894

(22) PCT Filed: Nov. 12, 1997

(86) PCT No.: PCT/EP97/06319

§ 371 (c)(1),
(2), (4) Date: May 26, 1999

(87) PCT Pub. No.: WO98/24193

PCT Pub. Date: Jun. 4, 1998

(30) Foreign Application Priority Data

Nov. 26, 1996 (DE) .......................................... 96118916

(51) Int. Cl.$^7$ ................................................ H04Q 7/20
(52) U.S. Cl. ...................... 455/423; 455/67.1; 455/67.4
(58) Field of Search .................. 455/423, 414, 455/443, 444, 445, 450, 452, 453, 67.1, 67.2, 67.3, 67.4

(56) References Cited

U.S. PATENT DOCUMENTS

| | | | | |
|---|---|---|---|---|
| 5,544,155 A | * | 8/1996 | Lucas et al. ................ | 455/67.6 |
| 5,828,658 A | * | 10/1998 | Ottersten et al. ............ | 370/310 |
| 5,886,988 A | * | 3/1999 | Yun et al. .................... | 455/509 |
| 5,936,999 A | * | 8/1999 | Keskitalo .................... | 375/200 |
| 5,970,060 A | * | 10/1999 | Baier et al. ................. | 370/342 |

FOREIGN PATENT DOCUMENTS

| | | |
|---|---|---|
| DE | 41 21 356 C2 | 1/1993 |
| DE | 43 29 320 A1 | 3/1995 |
| DE | 195 09 867 A1 | 9/1996 |
| EP | 0 526 439 A1 | 2/1993 |

OTHER PUBLICATIONS

Konzept eines CDMA–Mobilfunksystems mit gemeinsamer Detektion fur die dritte Mobilfunkgeneration, Teil 1, Jung et al., pp. 10–14.
Konzept eines CMDA–Mobilfunksystems mit gemeinsamer Detektion fur die dritte Mobilfunkgeneration, Teil 2, Jung et al., pp. 24–27.
The Capacity for a Discrete–State Code Division Multiple–Access Channel, Alencar, et al. pp. 925–937.
Neural Networks for Multiuser Detection in Code–Division Multiple–Access Communications, Aazhang et al., pp. 1212–1222.
Multiuser Detection for CDMA Systems, Hallen, et al. pp. 46–58.
Neural Network Techniques for Multi–user Demodulation, Mitra et al., pp. 1538–1543.

* cited by examiner

*Primary Examiner*—Thanh Cong Le
*Assistant Examiner*—Thuan T. Nguyen
(74) *Attorney, Agent, or Firm*—Bell, Boyd & Lloyd LLC

(57) ABSTRACT

A reception device is disclosed for a radio communication system for the reception of subscriber signals via a radio interface. The reception device contains a means for determining number of active subscribers from the a total number of subscribers that are assigned to the radio interface, and contains a further detection device for detecting at least one subscriber signal. As a result of the determination of the subscribers actually active from the subscriber signals, a detection is simplified particularly when the subscriber signals are separated by a fine structure.

19 Claims, 4 Drawing Sheets

( Prior Art )

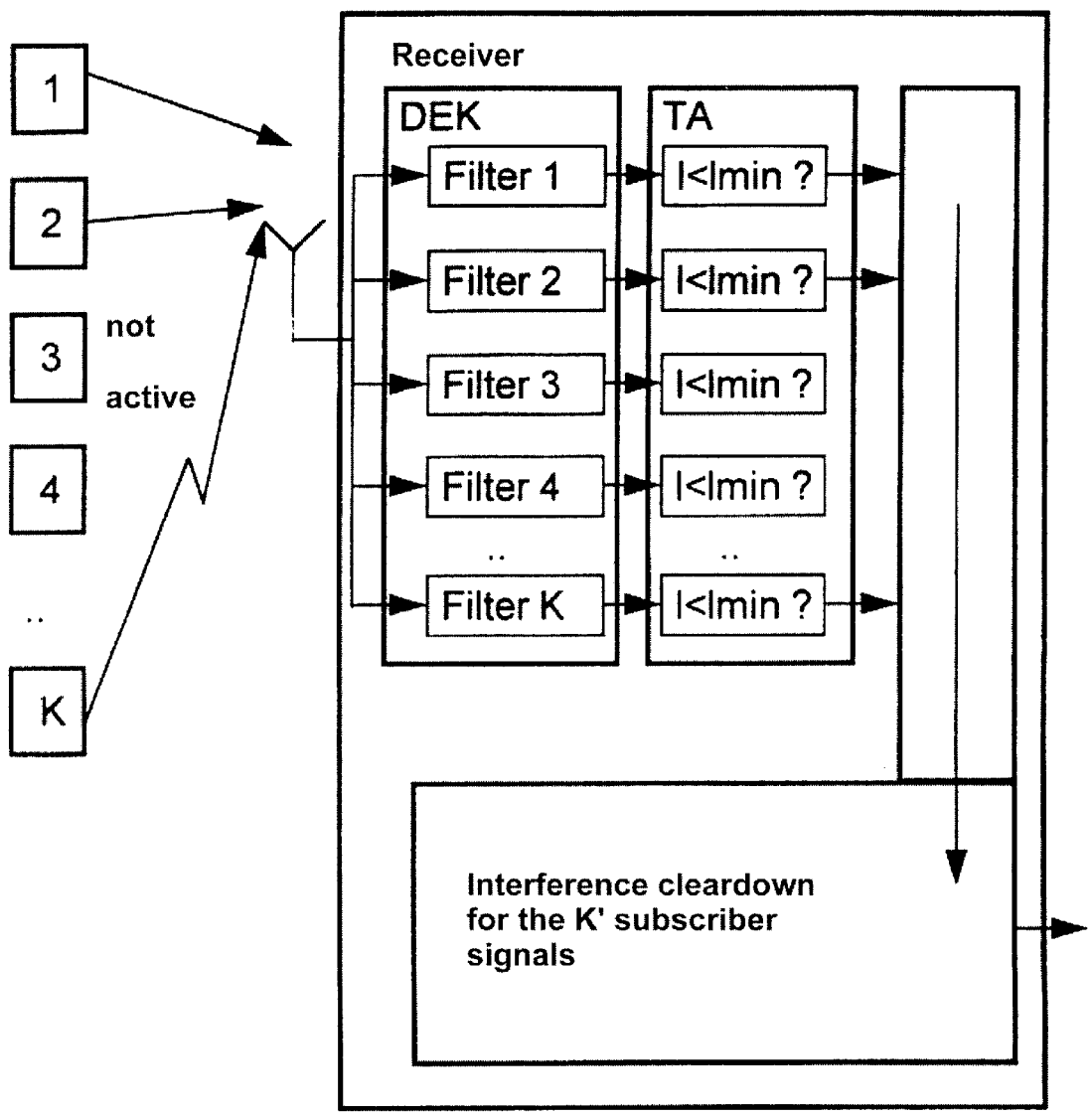

RECEPTION DEVICE FOR A RADIO COMMUNICATION SYSTEM FOR RECEIVING SUBSCRIBER SIGNALS VIA A RADIO INTERFACE

BACKGROUND OF THE INVENTION

1. Field of the Invention

The present invention relates to a reception device for a radio communication system for receiving subscriber signals via a radio interface wherein the reception device contains a device for determining a number of active subscribers from a total number of subscribers that are assigned to the radio interface and further contains a detection device for detecting at least one subscriber signal.

2. Description of the Prior Art

Radio communication systems serve for the transmission of subscriber signals via a radio interface with the assistance of high-frequency oscillations. Such radio communications systems are, for example, mobile radio telephone networks or devices for wireless subscriber connection to a fixed network. When the subscriber signals of various subscribers are transmitted via the radio interface, it is called a multi-subscriber message transmission system. Time-division multiplex, frequency-division multiplex or code-division multiplex methods can be employed for separating the subscribers. It is also possible to combine these methods.

When, according to a multi-subscriber message transmission system, for example, K different subscribers are allocated to the radio interface formed by a channel, the corresponding reception device must be able to undertake a separation of the subscriber signals. Depending on the number of different subscribers, this leads to a considerable detection outlay in the reception device, since the actual conditions on the radio interface are unknown to the reception device.

U. Mitra, H. V. Poor, "Neural Network Techniques for Multi-User Demodulation", Proceedings of the international conference on neural networks, San Francisco, Mar. 28–Apr. 1, 1994, Vol. 3, pp. 1538–1543, and B. Aazhang, B.-P. Paris, "Neural Networks for Multi-User Detection in Code-Division Multiple-Access Communications", IEEE Transactions on Communications, Vol. 40, No. 7, Jul. 1, 1992, pp. 1212–1222, disclose detection principles for CDMA transmission methods suitable for a different number of subscribers. EP-A-0 526439 discloses a CDMA receiver wherein only the strongest signals are evaluated. Further, P. Jung, B. Steiner, "Konzept eines CDMA-Mobilfunksystems mit gemeinsamer Detektion für die dritte Mobilfunkgeneration", Nachrichtentechnik/Elektronik 45 (1995), March/April 1995, pp. 24–27, discloses a CDMA transmission method in time slots.

The invention present is, present therefore present direct toward reducing the detection outlay.

SUMMARY OF THE INVENTION

The inventive reception device for a radio communication system for the reception of subscriber signals via a radio interface contains a device for determining the plurality K' of active subscribers from a set of K subscribers allocated to the radio interface and contains a detection device for detecting at least one subscriber signal. A signal mix present at the reception device can be processed better and the subscriber signals can be detected better since, given a plurality K'<K of active subscribers, the set of subscribers to be taken into consideration in the detection is reduced.

According to an embodiment of the present invention, the reception is improved further when the device for determining the K' active subscribers is connected such to the detection device that the plurality K' of active subscribers and their identity is communicated to the detection device. When the K' active subscribers are known to the detection device on the basis of their identify, then a plurality K–K' of subscribers can remain out of consideration in the separation of the subscriber signals.

When the subscriber signals arrive at the reception device by radial blocks, then the device for determining the K' active subscribers advantageously determines these from the subscriber signals related to radial blocks. Since the plurality of the K' active subscribers can change from radial block to radial block, a determination of the K' active subscribers from the subscriber signals constantly gives the reception device current values that are required for the detection. Some other signaling regarding the plurality of K' active subscribers thereby need not be undertaken. A plurality of radial blocks can be combined for a higher measuring position in this evaluation related to radial blocks.

The inventive reception device is particularly advantageous when the subscriber signals are primarily separated by a fine structure. Such a fine structure is established, for example, in the code-division multiplex method (CDMA-code division multiple access) since a subscriber-related code is allocated to every subscriber at the transmission side. As the corresponding reception device knows at least the code of the at least one subscriber signal.

The separation of the subscribers thus occurs via their subscriber code. The subscriber signals are modulated with this subscriber code. When the subscriber signals, as disclosed, for example, by German Letters Patents DE 41 21 356 C2 or DE 43 29 320 A1, are detected according to what is referred to as the JD (joint detection) CDMA method, then it is particularly significant that the plurality of subscriber codes to be taken into consideration is reduced. The inventive reception device offers particular advantages here.

According to a further embodiment of the reception device, the device for determining the K' active subscribers is connected such to the detection device that the fine structures of the K' active subscribers are communicated to the detection device. The fine structures that are thus communicated serve the JD-CDMA detection algorithm for separating one or more subscriber signals accordingly the influence of the respectively other K'–1 active subscribers is also taken into consideration. The device for determining the K' active subscribers is advantageously configured such that a respective test quantity is determined from the K possible subscriber signals and is compared to a threshold. Which of the K subscribers is, in fact, active at the moment derives from this comparison.

According to an a further embodiment, this test quantity has been determined from a quantity proportional to the energy of a channel pulse response of the respective subscriber signal. A channel model of the reception device is required for distortion-correction of subscriber signals, for which reason a channel pulse response is determined for each subscriber signal and the channel model can be balanced accordingly. The energy of the channel pulse response or, respectively, equivalent quantities such as the power, is a suitable quantity for determining the activity of a subscriber. Alternatively, the test quantity quantity can be determined from a sum of the amounts of samples of the respective subscriber signals; for example, of the data-bearing part of the subscriber signal. Given a digital transmission, samples from which the subscriber signals are subsequently to be reconstructed are identified at the reception device. A conclusion about the activity of the respective subscriber is all the more reliable the more strongly the samples contrast with noise on the radio interface.

According to further embodiments of the present invention, the test quantity can be determined from a data-carrying part of the respective subscriber signal (particularly suitable when no balance values are available), i.e. from the samples for corresponding data symbols, or from a test sequence of the respective subscriber signal. A test sequence is thereby a plurality of symbols that is sent by the respective transmission device in addition to the transmitted data and that is known undistorted at the reception device. For example, the reception device can determine the channel pulse response from a comparison of known test sequence to received test sequence.

When the set of possible fine structures is limited, then the advantage arises for the reception device that the set of K subscribers can also be limited and the outlay for determining the K' active subscribers is reduced.

It must be noted for defining the threshold that this not be placed too low since this leads to an incorrect determination of active subscribers. However, the threshold also should not be set too high since subscribers who are, in fact, not active but transmit with a low transmission power are not detected. Advantageously, accordingly, the threshold is defined proportional to the signal/noise ratio of the respective subscriber signal or proportional to the average signal/noise ratio of a plurality of subscriber signals.

It is also possible to orient the threshold based on the signal/noise ratio of the strongest subscriber signal. When a communication connection covers a plurality of channels, it is advantageous that the threshold is respectively proportional to the weakest of the subscriber signals so that none of the channels is lost. Advantageously, the thresholds for the individual subscribers of the K subscribers can be individually set in order to achieve a best possible adaptation to the subscriber-related conditions of the radio interface.

The inventive reception device is particularly suited for utilization in base stations or mobile stations of a mobile radio telephone system or as a radio station of a wireless access network (RITL radio in the loop).

Additional features and advantages of the present invention are described in, and will be apparent from, the Detailed Description of the Preferred Embodiments and the Drawing.

DESCRIPTION OF THE DRAWING

FIG. 4 shows a block circuit diagram of a reception device of the present invention with a determination of the K' active subscribers with the assistance of output values of digital, adapted filters.

DETAILED DESCRIPTION OF THE PREFERRED EMBODIMENTS

Figure 1:
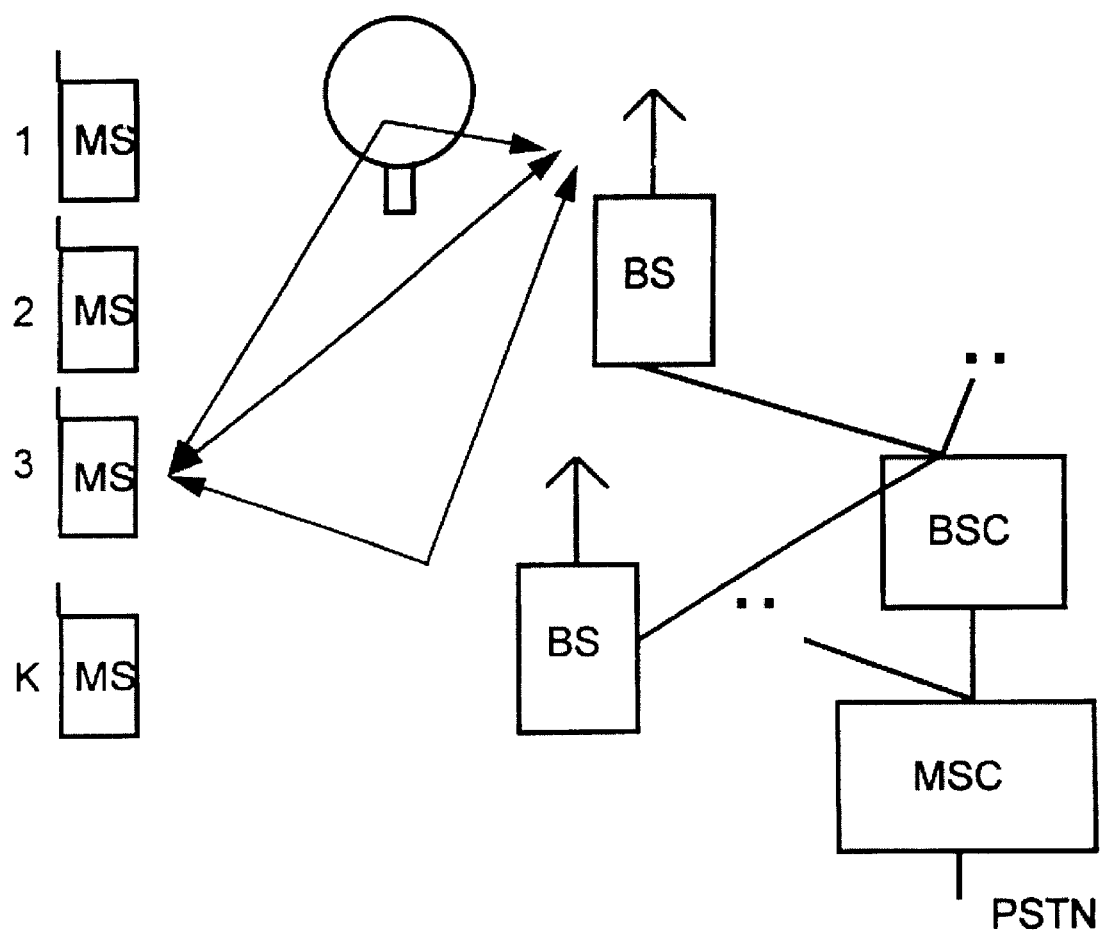
FIG. 1 shows a mobile radio telephone network.

The mobile radio telephone network according to FIG. 1 (also see J. Biala, "Mobilfunk und intelligente Netze" Vieweg Verlag Wiesbaden/Braunschweig, 1995 and P. Jung, "Konzept eines CDMAM-obilefunksystems mit gemeinsamer Detektion für die dritte Mobilefunkgeneration", Parts 1 and 2, Nachrichtentechnik/Elektronik, Berlin, 1995, No. 1, pages 10–14 and No. 2, Pages 24–27, is composed of at least one mobile switching center MSC that either is networked with further mobile switching centers MSC or, produces the network transition to a fixed network PSTN. Further, the illustrated mobile switching center MSC is connected to at least one base station controller BSC. According to FIG. 1, two base stations BS are connected after the base station controller. A radio interface via which subscriber signals are transmitted from or, respectively, to the K mobile stations exists between a base station BS and mobile stations MS1, MS2, MS3 through MSK.

An operations and maintenance center OMC also belongs to the mobile radio telephone network; this being connected to a mobile switching center MSC and being provided for monitoring the power parameters of the mobile radio telephone network as well as for maintenance and error checking. It can be provided that, for example, a base station system offers independent operations and maintenance centers for sub-components of the mobile radio telephone network.

A radio communication system (not shown) for wireless network access for subscribers is formed, for example, such that remote base stations are directly connected to switching centers of the fixed network, and connect the subscribers, which are not mobile but stationary in this case, to the fixed network via a radio interface.

A message channel shall be considered below, wherein the K subscribers are separated either by a time slot, as in the TDMA method, or by their frequency, as in the FDMA method. The subscriber signals are thus distinguished from one another by a subscriber code in a channel characterized by a frequency and, potentially, by a time slot. The reception device disclosed below, however, also can also be utilized when some other type of subscriber separation, occurs. In the separation of the subscribers by their subscriber code, the subscriber signals are modulated with the subscriber code at the transmission side and are detected at the reception side according to the JD-CDMA method on the basis of the subscriber codes present thereat.

Figure 2:
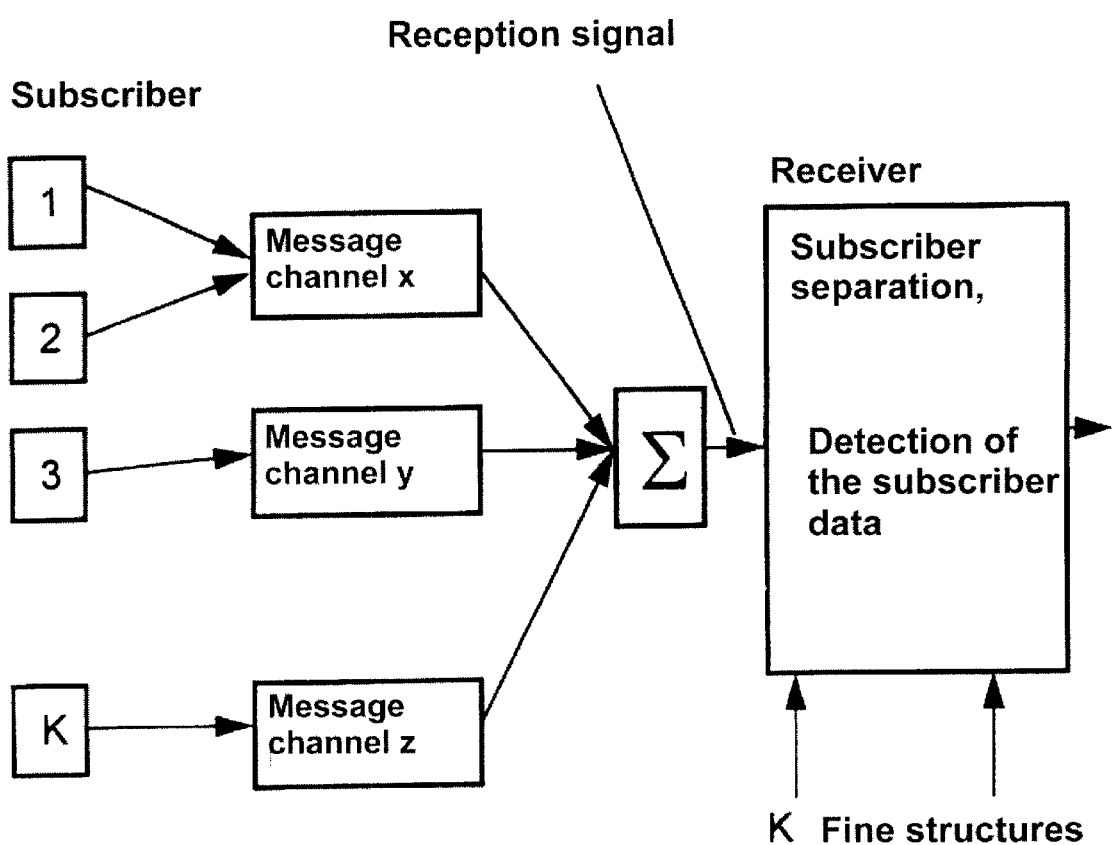
FIG. 2 shows a block of circuit diagram of a message transmission system, where in the message channels for the K subscribers are only separated by the subscriber code.

Given the message transmission system according to FIG. 2, whereby the subscribers are formed by mobile stations, the subscriber signals are transmitted via various types of message channels and arrive at the reception device as an aggregate signal. The message channels of the various subscribers can arrive at the reception device influenced in the greatest variety of ways due to the position of the mobile station with reference to the reception device, due to a multi-path propagation, and due to detractions or reflections at obstacles and can superimpose thereat.

When the reception device is a receiver of a base station BS of a mobile radio telephone network, then a separation of the K subscriber signals and a detection of the data of all subscribers occurs. To that end, the fine structure that is formed by the subscriber code of all subscribers to be separated must be known. When the separation occurs according to the JD (joint detection) CDMA method, then an improvement of the reception is achieved in the separation of a single subscriber signal by correspondingly taking the other subscriber signals, whose subscriber code is likewise known, into consideration. The receiver of the base station BS can supply the data of all K subscribers to the further components of the mobile radio telephone network following the detection.

When the receiver is a matter of a mobile station MS, then only one subscriber signal is usually detected. As such, it is also advantageous to know the remaining subscriber codes and take them into consideration for an improved detection.

Figure 3:
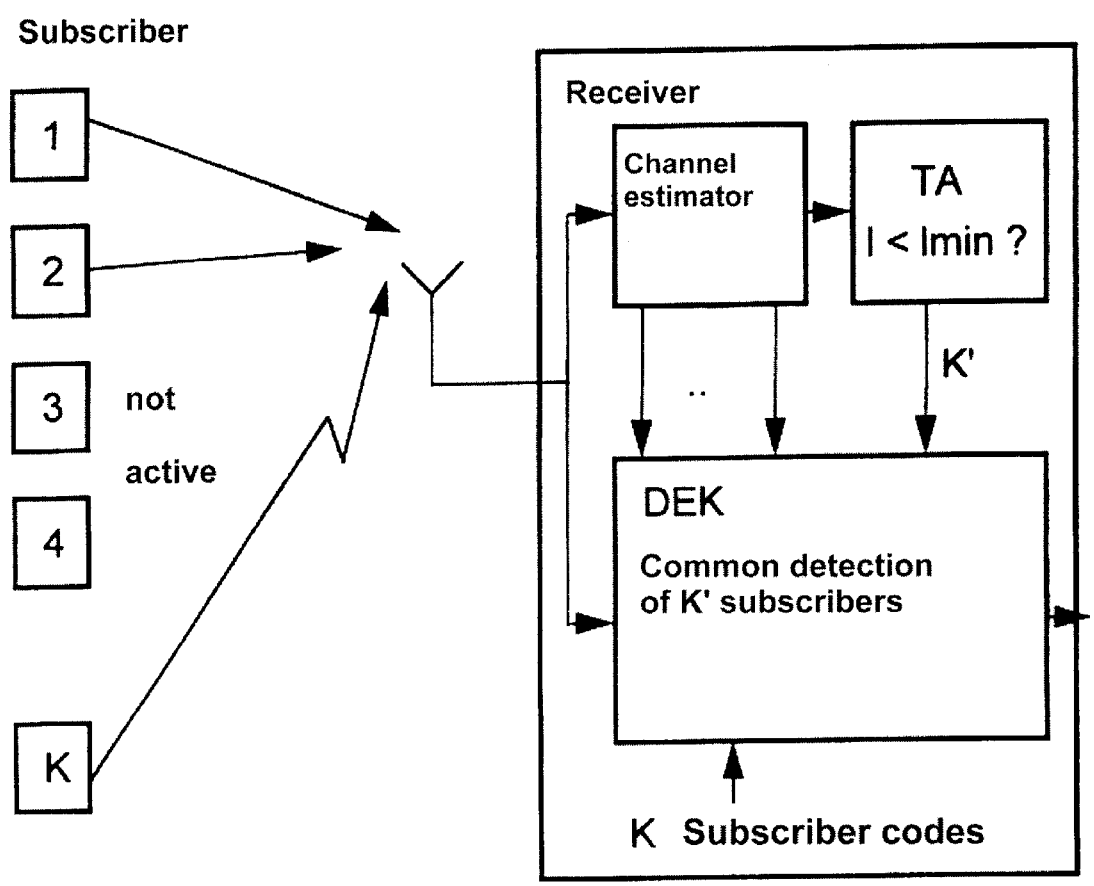
FIG. 3 shows a block circuit diagram of a reception device of the present invention with determination of the K' active subscribers from output values of a channel estimator.

FIG. 3 shows a reception device of the present invention as part of a base station BS of a mobile radio telephone network. K subscribers are thereby assigned to the radio interface for this base station BS. The subscribers 3 and 4 are not active at the moment. Given duplex connections, for example, this occurs given speaking pauses. Inactive subscribers also occur, for example, in a packet data transmission when a mobile station MS is not transmitting any packet data at a particular the moment.

The aggregate mix of the subscriber signals of the subscribers 1, 2 and K arrives in the reception device via an antenna. The corresponding channel models for the K subscribers are generated for the K mobile radio telephone channels in a channel estimator.

The channel pulse responses of the K subscribers acquired in the channel estimator also are evaluated by a device TA for determining the plurality K' of active subscribers, being evaluated to the effect that the respective energy of the channel pulse response serves for determining a test quantity 1 that is subsequently compared to a threshold 1 min. When the test quantity 1 is greater than or equal to the threshold 1 min, then the respective subscriber is active. This evaluation of the test quantities 1 of all K subscribers determines the plurality of the K' subscribers active at the moment. The device TA for determining the K' active subscribers is connected to a detection device DEK, as is the channel estimator. The channel estimator communicates values for the channel models to the detection device DEK, while the device TA communicates the plurality K', the identity and the subscriber codes of the K' active subscribers to the detection device DEK.

In the detection device DEK, which likewise accepts the aggregate mix of the subscriber signals of the K subscribers, a common detection occurs for the K' active subscribers. Therefore, it can thereby be alternatively provided that the subscriber codes are not communicated to the detection device DEK by the device TA for determining the K' active subscribers but, rather, the set of K subscriber codes allocated at the moment is already present in the detection device DEK and a corresponding selection occurs via the identity K' active subscribers. The data of the K' active subscribers are present at the output of the detection device DEK.

Alternatively to the energy of the channel pulse response, a sum of the amounts of samples of the respective subscriber signals also can also be employed as test quantity 1. The thresholds 1 min for the individual K subscribers can be set via an operations and maintenance center OMC. The height of the threshold 1 min is based on the signal/noise ratio for one or more message channels or, alternatively, on the energy at the output of the channel estimator or of the data detector.

The thresholds 1 min can be readjusted over time on the basis of the modifications of the radio interface. When a plurality of subscriber codes, i.e. plurality of subscriber signals, are allocated to a communication connection to a subscriber, then it must be assured by setting the thresholds 1 min that the weakest subscriber signal of the communication connection is also detected.

What are referred to as zero forcing or minimum error square (MMSE) algorithms can be utilized with or without feedback. Further detection algorithms are also known from A. Klein, "Multi User Detection of CDMA Signals-Algorithms and Applications to Cellular Mobile Radio", VDE-Verlag, No. 423, 1996. The subscriber codes of the subscriber signals, which form a fine structure, can be both orthogonal as well as non-orthogonal. Orthogonal subscriber codes yield the advantage that the cross-talk between the individual subscriber signals is lower. A greater code selection is available for non-orthogonal codes.

A further embodiment of the reception device shall be explained with reference to FIG. 4. The signal mix of the subscriber signals at the input of the reception device is supplied to a plurality of digital matched filters. These filters are respectively matched to a subscriber code and the corresponding channel pulse response. The plurality of these filters must correspond to the plurality of possible subscribers for the radio interface. A receiver implementing this signal-matched filtering can, for example, be formed as a bank of correlators or as a bank of RAKE receivers, see J. G. Proakis, "Digital Communications", New York, McGraw-Hill, 1995, in this regard.

A test quantity 1 can be acquired at the output of these digital matched filters on the basis of the sum of amount squares or, respectively, amounts of samples. A comparison of the test quantity 1 to a threshold 1 min occurs in a device TA for each digital matched filter for determining the K' active subscribers. Whether this subscriber is, in fact, active can be identified on the basis of this individual comparison.

The individual output signals of the digital matched filters and the decision about the activity of the respective subscriber are supplied to a detection device DEK. A balancing of the interferences with respect to the other subscribers and with respect to that in the inter-symbol interference occurs for the individual subscribers in this detection device DEK; see German Patent Application 195 09 867.6 with respect thereto. The data of the K' active subscribers are present at the output of the detection device DEK.

FIGS. 3 and 4 merely outline components of the inventive reception device. The corresponding RF components and the circuit-oriented components for signal processing, however, are well-known to a person skilled in the art.

The separation of the subscribers on the radio interface additionally occurs ensues with a time-division multiplex. A channel assigned by a time slot is respectively allocated to the subscribers so that the subscriber signals arrive in the reception device in radio blocks. A statement about the activity of subscribers respectively, occurs after evaluation of a received radio block. If brief-duration transmission modifications are to be compensated, a summing-up of the test quantity 1 occurs over a plurality of radio blocks.

Although the present invention has been described with reference to specific embodiments, those of skill in the art will recognize that changes may be made thereto without departing from the spirit and scope of the invention as set forth in the hereafter appended claims.

We claim:

1. A reception device for a radio communication system for receiving a plurality of subscriber signals via a radio interface, wherein a plurality of subscribers are assigned to the radio interface and the plurality of subscriber signals are distinguished from one another by a individual fine structures, wherein the subscriber signals comprise a first subscriber signal and further subscriber signals, the reception device comprising:

a detection device for detecting the first subscriber signal; and a device for determining a test quantity for each of the plurality of subscriber signals and for comparing each test quantity to a threshold, wherein only those of the further subscriber signal with a test quantity higher than the threshold are used for detection of the first subscriber signal by the detection device.

2. A reception device as claimed in claim 1, wherein the device for determining is connected to the detection device such that the number and identity of the active subscribers are communicated to the detection device.

3. A reception device as claimed in claim 1, wherein the plurality of subscriber signals arrive by radio blocks and the device for determining determines the subscribers related to the radio blocks.

4. A reception device as claimed in claim 1, wherein the device for determining is connected to the detection device such that the fine structures of the active subscribers are communicated to the detection device.

5. A reception device as claimed in claim 1, wherein the device for determining is configured such that test quantity is determined from a quantity proportional to an energy of a channel pulse response of a respective subscriber signal.

6. A reception device as claimed in claim 1, wherein the device for determining is configured such that the test quantity is determined from a sum of the amounts of samples of the respective subscriber signals.

7. A reception device as claimed in claim 1, wherein the device for determining is configured such that the test quantity is determined from a data-carrying part of a respective subscriber signal.

8. A reception device as claimed in claim 1, wherein the device for determining is configured such that the test quantity is determined from a test sequence of a respective subscriber signal.

9. A reception device as claimed in claim 1, wherein a limited set of fine structures that may be used by the plurality of subscribers is present.

10. A reception device as claimed in claim 1, wherein the fine structures contain a subscriber code.

11. A reception device as claimed in claim 1, wherein the threshold is proportional to a signal/noise ratio of a respective subscriber signal.

12. A reception device as claimed in claim 1, wherein the threshold is proportional to an average signal/noise ratio of a plurality of subscriber signals.

13. A reception device as claimed in claim 1, wherein the threshold is proportional to a lowest-power subscriber signal of a communication connection covering a plurality of channels.

14. A reception device as claimed in claim 1, wherein the threshold may be individually set for individual subscribers of the plurality of subscribers.

15. A reception device as claimed in claim 1, further comprising:

a channel estimator for evaluating the plurality of subscriber signals, wherein the channel estimator is connected to both the device for determining and the detection device.

16. A reception device as claimed in claim 1, wherein the reception device detects subscriber signals in a base station of a mobile radio telephone system.

17. A reception device as claimed in claim 1, wherein the reception device detects a subscriber signal in a mobile station of a mobile radio telephone system.

18. A reception device as claimed in claim 1, wherein the reception device detects at least one subscriber signal in a radio station of a wireless access network.

19. A method of receiving a plurality of subscriber signals via a radio interface in a radio communication system, wherein a plurality of subscribers are assigned to the radio interface and the plurality of subscriber signals are distinguished from one another by individual fine structures, the method comprising the steps of:

determining a test quantity for each of the plurality of subscriber signals;

comparing each test quantity to a threshold; and detecting a first subscriber signal of the plurality of subscriber signals by using only the subscriber signals having a test quantity higher than the threshold.

* * * * *